March 31, 1970  J. ZIZLSPERGER ET AL  3,504,068
PROCESS FOR MOLDING COMPLETELY EXPANDED POLYOLEFIN PARTICLES
Filed Dec. 13, 1967  2 Sheets-Sheet 1

INVENTORS:
JOHANN ZIZLSPERGER
FRITZ STASTNY
GILBERT BECK
HERMANN TATZEL
BY
Marzall, Johnston, Cook&Root
ATT'YS

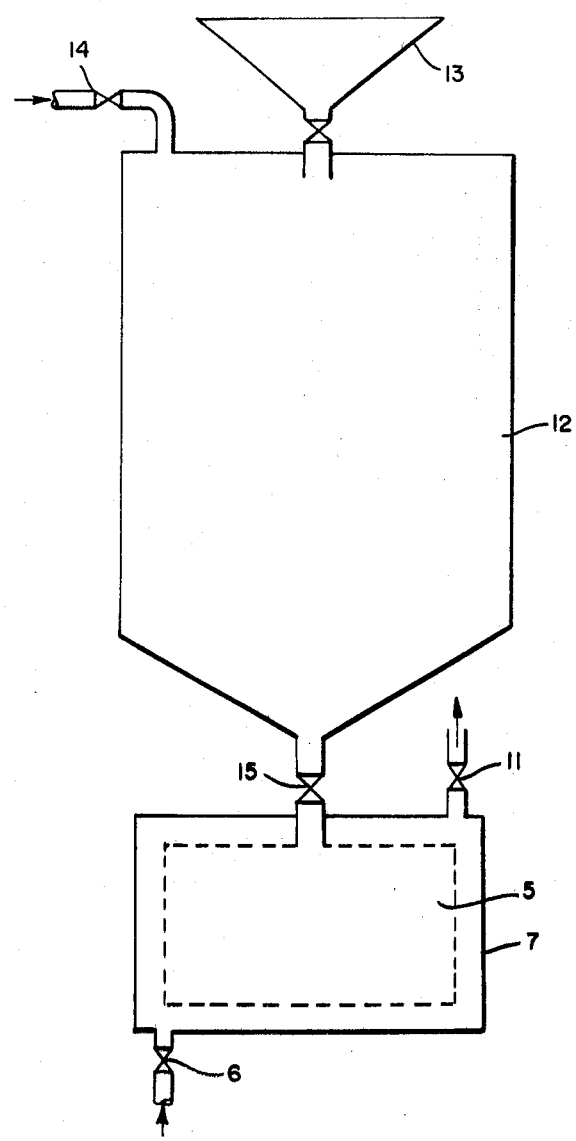

3,504,068
PROCESS FOR MOLDING COMPLETELY EXPANDED POLYOLEFIN PARTICLES
Johann Zizlsperger, Frankenthal, Pfalz, and Fritz Stastny, Gilbert Beck, and Hermann Tatzel, Ludwigshafen (Rhine), Germany, assignors to Badische Anilin- & Soda-Fabrik Aktiengesellschaft, Ludwigshafen (Rhine), Germany
Filed Dec. 13, 1967, Ser. No. 690,215
Claims priority, application Germany, Dec. 16, 1966, 1,629,316
Int. Cl. B29d 27/08
U.S. Cl. 264—41                    4 Claims

ABSTRACT OF THE DISCLOSURE

A process for the production of expanded plastics moldings in which heated particles of a completely expanded olefin polymer are introduced into a mold, the gas pressure in the mold is then increased, the volume of the cavity is decreased to 90 to 40% of the original bulk volume of the particles introduced, and then the pressure in the mold is decreased, to cause the particles to bond together. The surface of the particles may be coated with a curable binder prior to the molding process.

---

Figure 1:
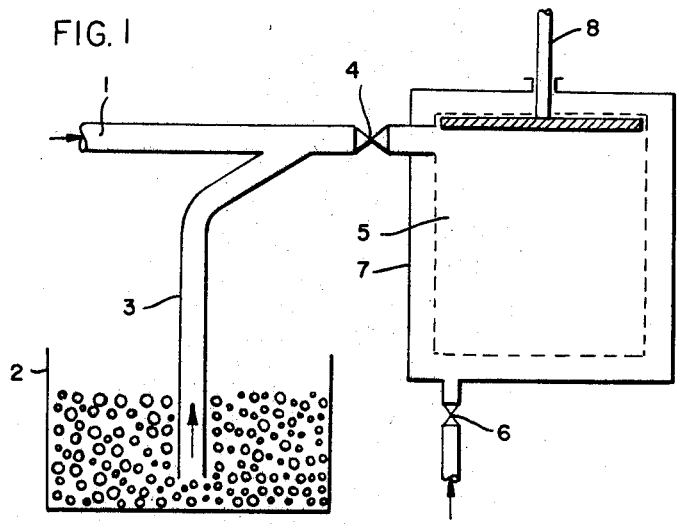

This invention relates to a process for the production of moldings of expanded olefin polymers in which expanded particles of the polymer are bonded by means of a binder or fused together by means of heat in molds under pressure.

For the production of moldings having cellular structure, a method has been widely used in industry in which a styrene polymer containing an expanding agent is first preexpanded and the preexpanded product, following a short period of storage, is heated in a mold so that the particles expand further and fuse together to form a molding whose dimensions correspond to those of the cavity of the mold. This method makes it possible to prepare moldings of intricate shape, such as are used for example as packaging components. This method has however proved to be suitable only for styrene polymers. So far it has not been possible to fuse together other cellular polymers, for example olefin polymers, in molds with equality satisfactory results.

Expanded olefin polymers having closed-cell structure may be obtained for example by a method in which the polymer is mixed with expanding agent in continuous mixing equipment, for example in an extruder, and the mixture is released from pressure after leaving the extruder die. With certain expanding agents it is possible by this method to obtain cellular particles or sheeting whose unit weight is from 20 to 50 grams/liter. It is however not suitable for the production of moldings of intricate shape.

According to another method olefin polymers are heated under pressure in a mold with an expanding agent which decomposes into gaseous products when heated; the molding is allowed to cool and is then reheated to a high temperature so that it expands further. In this case, too, only moldings of simple shape can be obtained.

Moreover it has been proposed to prepare expanded plastics moldings by heating expanded olefin polymer particles containing cross-linked constituents and fusing them together under pressure. This method does not satisfy all technical requirements. Thus for example it is difficult to prepare by this method large moldings having a homogeneous foam structure.

It has furthermore been proposed to mix particulate expanded olefin polymers with binders, to compress the mixtures and to carry out curing under pressure.

We have now found that the production of expanded plastics moldings by bonding together particles of expanded olefin polymers under pressure in a mold can be carried out in a particularly advantageous manner by introducing the particles into a mold, increasing the pressure in the mold, decreasing the volume of the cavity to 90 to 40% of the original bulk volume of the particles introduced and then lowering the pressure in the mold.

Olefin polymers in accordance with the invention are crystalline olefin polymers whose X-ray crystallinity at 25° C. is more than 25%. Homopolymers of ethylene or propylene, or copolymers of these monomers, are suitable for the process. Copolymers of ethylene with other olefins, for example n-butene, or with other ethylenically unsaturated monomers, which contain at least 50% by weight of polymerized units of the olefin are also suitable. Copolymers of ethylene with 5 to 30% by weight of acrylic esters, methacrylic esters or vinylcarboxylic esters are preferred. For example copolymers which have been obtained by copolymerization of ethylene and tertiary-butyl acrylate, tertiary-butyl methacrylate, isopropyl acrylate or isopropyl methacrylate, are particularly suitable for the process. The polymers are outstandingly suitable even when the conditions of production of the polymers are such that part of the polymerized units of acrylic ester results in the formation of incorporated free acid groups with elimination of, for example, isobutylene. In this case the ethylene copolymers contain 0.1 to 7 mole percent, preferably 0.2 to 5 mole percent, of polymerized units of carboxylic acids. The content of units of carboxylic esters of tertiary-butyl alcohol or of isopropanol amounts to 1 to 5, preferably 2 to 3.5 mole percent.

Particulate closed-cell expanded olefin polymers are used for the process according to this invention. The diameter of the particles is preferably from 3 to 40 mm., advantageously from 5 to 25 mm. Closed-cell particles are defined as particles in which the cell membranes consist of the olefin polymer. It is preferred to use for the process particles having a predominant proportion of closed cells. Particulate closed-cell polyolefins whose compression set (according to DIN 53,572) is less than 10% at 20° C. The expanded particles are obtained by conventional industrial methods, for example by mixing the olefin polymer with an expanding agent in an extruder and extruding the mixture through a die, the extrudate containing expanding agent being comminuted immediately after leaving the die. It is also possible however to use particles which have been obtained by heating a mixture of an olefin polymer and an expanding agent which decomposes with the formation of gaseous products. In general the particles have a unit weight of 8 to 30 grams per liter.

The expanded particles may contain crosslinked constituents, i.e. a portion of the molecules may be present in crosslinked form.

The particles of expanded olefin polymer may contain, in addition to the polymer, other constituents such as flame-proofing agents, dyes, fillers, lubricants or other polymers, for example polyisobutylene. Sometimes it is advantageous to process the expanded particles mixed with coarse-grained or fibrous fillers or reinforcement materials. Examples of these are wood fibers, other porous materials or fibers of thermoplastics. Coarse-meshed fabrics or netting, for example of thermoplastics, may also be incorporated in the moldings as reinforcement materials.

Bonding the particles together is carried out in closed molds. At least one wall of the mold should be movable with respect to the opposite wall so that the cavity in the mold can be varied at will. It is advantageous to use a mold in which the said mold wall is constructed as a pressure ram. It is also possible to use molds in which more than one wall, for example two opposite walls, are movable. The molds have gas inlet and outlet valves so that the gas pressure in the cavity of the mold can be raised, for example by forcing in gases, for example air, and later released.

The particular expanded olefin polymer material is introduced into the mold, after which the mold is closed and the pressure in the cavity is increased by forcing in gas. The pressure is advantageously raised to 1 to 8 atmospheres gauge, particularly 2 to 5 atmospheres gauge. Preferred gases for forcing into the mold cavity are air and nitrogen, although other gases, such as chlorofluorocarbon compounds, may also be used. The particles are compressed while under the pressure of the gas so that they are deformed. Thus for example the particles having an original unit weight of from 20 to 30 grams per liter acquire a unit weight of from 50 to 100 grams per liter as a result of the pressure.

One minute to two hours after the compressed gas has been forced in (the period varying according to the type of bonding process chosen), at least one wall of the mold is moved towards the opposite wall. The walls of the mold are brought together to such an extent that the volume of the cavity is decreased to 90 to 40%, preferably 60 to 50%, of the original bulk volume of the particles in the mold. The original bulk volume is defined as the volume which the particles occupy prior to forcing the gas into the mold.

After the cavity has been made smaller, the pressure in the cavity is decreased. The pressure may be decreased to atmospheric pressure. It is possible however to evacuate the cavity so that subatmospheric pressure is set up in the mold.

During and after the lowering of the internal pressure in the mold, the plastics particles expand and are pressed together under the excess pressure prevailing in the cells. The particles are thus bonded together, with deformation, to form a molding whose dimensions correspond to those of the cavity of the mold.

The particles are bonded together in molds under pressure. The term "bonding" for the purposes of this invention means fusing together or sticking together.

If an adhesive is used, this is advantageously applied to the surface prior to placing the expanded particles in the pressure molds. Curable binders free from solvent are particularly advantageous. In principle all curable binders are suitable, but within this group of substances the unsaturated polyester resins and the epoxy resins are of particular importance. Polyester resins are mixtures of unsaturated polyesters and polymerizable monomers, such as styrene. Among the epoxy resins (sometimes referred to in technical parlance as polyepoxides) conventional commercial compounds containing epoxy groups and mixtures thereof which can be processed together with curing agents, such as primary and secondary diamines, are suitable. Polyester resins and epoxy resins are described for example by Houben-Weyl "Methoden der organischen Chemie", 4th edition, volume XIV/2, part 2, Georg Thieme Verlag, page 34 et seq. Examples of other suitable binders are mixtures of polyisocyanates and polyols such as are used for the production of polyurethane plastics. Sometimes polymers containing polymerizable double bonds may be used together with vulcanizing agents as binders, for example in the form of dispersions or solutions; compounds known as polybutadiene oils are also suitable together with vulcanizing agents.

The amount of binder required for the process is dependent on the size of the expanded olefin polymer particles, their shape and their surface. Amounts of from 0.3 to 4 grams per liter of expanded polyolefin particles are usually adequate. When particles which are substantially spherical and which have mean diameters of from 5 to 20 mm. are used, it is preferable to use from 0.6 to 2 grams of resin per liter of expanded plastics particles. Larger amounts of resin may be used but the advantageous properties of the moldings obtained in accordance with this invention may thereby be impaired.

Sometimes it is also possible to avoid using solutions or dispersions of binders in the mold. For example the particles may be coated with a solution or dispersion of the binder, the solvent or dispersing agent evaporated and the particles then bonded together.

Moreover the particles may be bonded by fusing them together. For this purpose it is necessary to heat the surface of the expanded plastics particles to temperatures higher than the crystallite melting point of the olefin polymer. The particles are usually heated to temperatures which are 5° to 20° C. above the melting point. It is advantageous to heat them until the surface has acquired a temperature in this range. This may be effected for example by supplying to the material an amount of heat which is from 2 to 5% of the amount of heat required to melt the whole mass of the olefin polymer.

The particles may be heated prior to introduction into the mold or in the mold itself. For example the pressure in the mold may be produced by forcing in hot air. If the particles are heated outside the mold, the mold must be closed and the pressure raised and released again within a period of time in which the surface temperature of the particles does not fall below a value which is 5° C. higher than the crystallite melting point.

The process according to this invention has the advantage that moldings of particulate olefin polymers are obtained which have relatively large dimensions and completely uniform foam structure.

The invention is illustrated by the following examples.

EXAMPLE 1

An apparatus as shown diagrammatically in FIGURE 1 of the drawing is used for carrying out the process. Air at 100° C. is blown through line 1, with valve 4 open, into the cavity 5 of a mold 7. Expanded particles which have a mean diameter of 8 mm. and consist of an ethylene polymer containing 22% of polymerized units of tertiary-butyl acrylate, are conveyed from a container 2 through line 3 into the cavity 5. The particles have a gel content of 30% and a unit weight of 10 grams per liter. The surface of the particles is heated to 95° C. during conveyance. After the cavity 5 has been completely filled, the valve 4 is closed. Air at 80° C. is forced through an inlet provided with a valve 6 into the mold 7 until a pressure of 2.5 atmospheres gauge has been set up. The inlet valve 6 is then closed. The particles contained in the cavity 5 are compressed by the air forced in to about half of the volume of the cavity 5 so that their unit weight is increased from 10 to 20 grams per liter. The plunger 8 is then lowered to about half the height of the cavity and stopped. The inlet valve 6 is then opened, thus releasing the internal pressure in the mold 7 to atmospheric pressure. The particles contained in the cavity 5 expand and fuse together to form a molding. After a cooling period of ten minutes, the mold 7 is opened and the molding is removed therefrom. It has a density of 20 grams per liter.

Particles consisting of a mixture of 90% of a copolymer of 90 parts of ethylene and 10 parts of isobutylene and 10% of polyisobutylene may be fused together by the same method at a temperature of 125° C. and a pressure of 5 atmospheres gauge.

EXAMPLE 2

Figure 2:
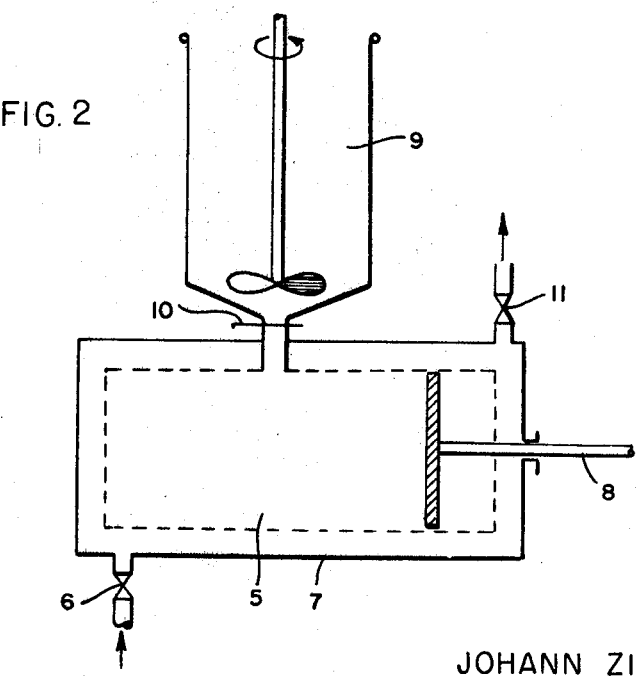

The apparatus shown diagrammatically in FIGURE 2 is used for carrying out a method in which the particles are bonded together with a binder. Expanded particles of polyethylene having a density of 0.918, which have a diameter of 10 mm. and a unit weight of 20 grams per liter are mixed with a binder in a stirred vessel 9, the ratio by weight of binder to expanded particles being 1:100. The binder consists of an epoxy resin which contains an organic diamine as curing agent. The closing means 10 is opened so that the particles flow into the cavity 5 of the mold 7. After the cavity 5 has been filled, the closing means 10 is closed. Air at 70° C. is then forced in through an inlet valve 6 until a pressure of 3 atmospheres gauge has been set up in the mold 7. The particles are compressed to 70% of their original bulk volume. Fifteen minutes later the inlet valve 6 is closed and the plunger 8 is forced into the mold to such an extent that the particles are pressed together. The plunger 8 is stopped and the outlet valve 11 is opened. The particles expand and are bonded together. Air at 70° C. is then blown through the inlet valve 6 into the cavity 5 and out through the outlet valve 11. The curing process is over after about two hours. The molding, which has a unit weight of about 30 grams per liter, is removed from the mold.

EXAMPLE 3

In a method using the apparatus as shown diagrammatically in FIGURE 3 of the drawing, expanded plastics particles are fed into a pressure container 12 through a hopper 13 provided with a valve. The particles have a diameter of about 10 mm. and a unit weight of 15 grams per liter. They consist of an ethylene copolymer which contains 8% of polymerized butyl acrylate units and 5% of polymerized acrylic acid units, with reference to the total amount of monomers. Air at 105° C. is blown through inlet line 14 (provided with a valve) into the container 12 until a pressure of 6 atmospheres gauge has been set up. The expanded particles are thus compressed to a unit weight of 50 grams per liter. On opening the valve 15, the compressed particles flow into the cavity 5 of the mold 7. Inlet valve 6 and outlet valve 11 are closed. After the cavity 5 has been filled, the valve 15 is closed. Valve 11 is then opened so that the pressure in the mold 7 is released to atmospheric pressure. The particles fuse together to form a molding whose dimensions correspond to those of the cavity 5 of the mold 7. Cold air is then blown in through inlet valve 6 and leaves through outlet valve 11 so that the molding is cooled. It may be removed from the mold after it has cooled.

EXAMPLE 4

Moldings are prepared from expanded particles using a binder by the method described in Example 2. The substances and amounts thereof used, as well as the results obtained are shown in the table, in which the following abbreviations are used:

PP=polypropylene
LPE=linear polyethylene having a density of 0.960 and a molecular weight of 150,000
Mixture=a mixture of 90% by weight of a copolymer of 90 parts of ethylene and 10 parts of isobutylene and 10% by weight of polyisobutylene
A=bitumen
B=a mixture of diethylene glycol and toluylene diisocyanate
C=a dispersion (35%) of polyisobutylene in water.

TABLE

| Expanded plastics particles of | PP | LPE | Mixture |
|---|---|---|---|
| Diameter of particles in mm | 25 | 8 | 4 |
| Unit weight in grams per liter | 15 | 30 | 25 |
| Binder | A | B | C |
| Amount of binder in grams per liter of plastics particles | 4 | 3.8 | 2 |
| Temperature at which the binder is applied to the particles (° C.) | 140 | 100 | 95 |
| Compression pressure (atmospheres gauge) | 8 | 6 | 4 |
| Volume of mold in percent of original bulk volume | 70 | 75 | 50 |

We claim:

1. A process for the production of expanded plastics moldings wherein particles of a completely expanded olefin polymer whose surface has been heated to temperatures higher than the crystallite melting point of the olefin polymer, said olefin polymer being selected from the group consisting of homopolymers of ethylene and propylene, copolymers of ethylene with other ethylenically unsaturated monomers, which contain at least 50% by weight of polymerized units of the olefin and ethylene copolymers, which contain 0.1 to 7 mole percent of polymerized units of carboxylic acids and 1 to 5 mole percent of units of carboxylic esters of tertiary-butyl alcohol or of isopropanol are subjected to increased gas pressure to decrease their bulk volume to 90 to 40% of their original bulk volume, the particles are confined within a space having substantially the said decreased bulk volume, and the pressure within said space is lowered, by reducing the gas pressure, to cause the particles to expand and bond together.

2. A process for the production of expanded plastics moldings wherein particles of a completely expanded olefin polymer selected from the group consisting of homopolymers of ethylene and propylene, copolymers of ethylene with other ethylenically unsaturated monomers, which contain at least 50% by weight of polymerized units of the olefin and ethylene copolymers, which contain 0.1 to 7 mole percent of polymerized units of carboxylic acids and 1 to 5 mole percent of units of carboxylic esters of tertiary-butyl alcohol or of isopropanol whose diameter is from 3 to 40 mm. and whose surface has been coated with a curable binder free of solvent at the rate of 0.3 to 4 grams per liter of expanded plastic particles are introduced into a mold, the pressure in the mold is raised to 1 to 8 atmospheres gauge, the volume of the cavity of the mold is decreased by moving at least one wall of the mold toward the opposite wall to 90% to 40% of the original bulk volume of the particles introduced and the pressure in the mold is then lowered, by reducing the gas pressure so that the particles bond together to form a molding.

3. A process for the production of expanded plastics moldings wherein particles of a completely expanded olefin polymer selected from the group consisting of homopolymers of ethylene and propylene, copolymers of ethylene with other ethylenically unsaturated monomers, which contain at least 50% by weight of polymerized units of the olefin and ethylene copolymers, which contain 0.1 to 7 mole percent of polymerized units of carboxylic acids and 1 to 5 mole percent of units of carboxylic esters of tertiary-butyl alcohol or of isopropanol whose diameter is from 3 to 40 mm. and whose surface has been heated to a temperature of from 5° to 20° C. above the crystallite melting point of the olefin polymer are introduced into a mold, the pressure in the mold is raised by forcing in gas to 1 to 8 atmospheres gauge, the volume of the cavity of the mold is decreased by moving at least one wall of the mold toward the opposite wall to 90% to 40% of the original bulk volume of the particles, and the pressure in the mold is decreased, by reducing the gas pressure, to cause the particles to expand and fuse together.

4. A modification of the process as claimed in claim 3 wherein expanded plastics particles are fed into a pressure container and compressed by introducing compressed gas, the compressed particles are transferred under pressure to a mold so as to fill the cavity thereof and the gas pressure is released so that the particles expand and bond together.

References Cited

UNITED STATES PATENTS

| | | | |
|---|---|---|---|
| 3,126,432 | 3/1964 | Schuur | 264—53 |
| 3,217,364 | 11/1965 | Genest | 264—53 X |
| 3,255,286 | 6/1966 | Luc-Belmont | 264—51 X |
| 3,278,658 | 10/1966 | Immel | 264—51 |
| 3,328,497 | 6/1967 | Baxter | 264—53 |
| 3,331,899 | 7/1967 | Immel | 264—51 X |
| 3,396,923 | 8/1968 | Windecker | 264—45 X |

OTHER REFERENCES

Graham, D. L., "A New Low Density Molding Material" S.P.E. Journal, October 1957, pp. 35–38.

JULIUS FROME Primary Examiner

P. A. LEIPOLD, Assistant Examiner

U.S. Cl. X.R.

260—2.5; 264—53, 126